(12) United States Patent
Guo et al.

(10) Patent No.: US 11,496,511 B1
(45) Date of Patent: Nov. 8, 2022

(54) SYSTEMS AND METHODS FOR IDENTIFYING AND MITIGATING PHISHING ATTACKS

(71) Applicant: Symantec Corporation, Mountain View, CA (US)

(72) Inventors: Xi Guo, Rancho Palos Verdes, CA (US); Mrinal Khanvilkar, Culver City, CA (US); Darshini Rathod, Los Angeles, CA (US); Jiejie Wang, Rancho Palos Verdes, CA (US)

(73) Assignee: NortonLifeLock Inc., Tempe, AZ (US)

( * ) Notice: Subject to any disclaimer, the term of this patent is extended or adjusted under 35 U.S.C. 154(b) by 301 days.

(21) Appl. No.: 16/560,237

(22) Filed: Sep. 4, 2019

(51) Int. Cl.
*G06F 21/00* (2013.01)
*H04L 9/40* (2022.01)

(52) U.S. Cl.
CPC ...... *H04L 63/1483* (2013.01); *H04L 63/1425* (2013.01)

(58) Field of Classification Search
CPC ......................... H04L 63/1483; H04L 63/1425
See application file for complete search history.

(56) References Cited

U.S. PATENT DOCUMENTS

| | | | | |
|---|---|---|---|---|
| 8,776,196 B1* | 7/2014 | Oliver | ................. | H04L 63/1408 726/6 |
| 10,467,622 B1* | 11/2019 | Rule | ................... | G06F 16/9566 |
| 2008/0071808 A1* | 3/2008 | Hardt | ................... | G06F 40/174 |
| 2009/0228780 A1* | 9/2009 | McGeehan | ......... | H04L 63/1441 715/234 |
| 2010/0313248 A1* | 12/2010 | Krivosheev | ......... | G06F 21/6263 726/5 |
| 2011/0191849 A1* | 8/2011 | Jayaraman | .......... | H04L 67/2814 726/23 |
| 2012/0272330 A1* | 10/2012 | Soghoian | ................ | H04L 51/14 726/26 |
| 2013/0104022 A1* | 4/2013 | Coon | .................... | G06F 40/174 715/226 |
| 2017/0195310 A1* | 7/2017 | Tyler | ..................... | G06F 21/554 |
| 2020/0242588 A1* | 7/2020 | Rule | .................. | G06Q 20/4018 |
| 2021/0342525 A1* | 11/2021 | Leme | .................... | G06F 40/174 |

FOREIGN PATENT DOCUMENTS

GB 2555384 A * 2/2018 ......... H04L 63/1483

* cited by examiner

*Primary Examiner* — Trong H Nguyen
*Assistant Examiner* — Michael M Lee
(74) *Attorney, Agent, or Firm* — FisherBroyles, LLP (57) ABSTRACT

The disclosed computer-implemented method for identifying and mitigating phishing attacks may include (i) receiving a request for sensitive data utilized to access a network service, (ii) launching an autofill provider for providing the sensitive data to the network service, (iii) identifying, utilizing the autofill provider, a domain for the network service and a data type associated with the sensitive data utilized to access the network service, (iv) determining, utilizing the autofill provider, a reputation for the network service based on the domain and the data type, and (v) performing a security action that protects against a phishing attack based on the reputation determined for the network service. Various other methods, systems, and computer-readable media are also disclosed.

20 Claims, 7 Drawing Sheets

SYSTEMS AND METHODS FOR IDENTIFYING AND MITIGATING PHISHING ATTACKS

BACKGROUND

Mobile computing devices are increasingly targeted by phishing attacks designed to cause unaware users to unintentionally leak sensitive information, such as login credentials for accessing websites and/or mobile applications, to malicious actors. For example, a phishing attack may include a fraudulent login screen for accessing a mobile banking application intended to capture a user's credentials which may be utilized to access a user's bank account information and/or conduct unauthorized transactions.

Conventional techniques for preventing phishing attacks may often include utilizing the traffic monitoring features found in many third-party virtual private network (VPN) applications or the monitoring of user actions (e.g., a user navigating to a browser and inserting a phishing link) by an accessibility service in a mobile computing device operating system. Under these conventional techniques, the VPN application or accessibility service is configured to continually run in the background on mobile computing devices and utilize blacklisting to prevent access to known phishing websites (in the case of VPN applications) or monitoring links to determine whether or not they are bad (e.g., phishing) links (in the case of accessibility services). However, VPN applications often suffer from user mistrust associated with allowing continuous third-party continuous access to their private data traffic. In addition, as both VPN applications and accessibility services must continuously run to monitor a user's data traffic or user actions, a mobile computing device's battery performance may often be adversely affected. Furthermore, mobile computing devices utilizing VPN applications may still be at risk of phishing attacks from unknown phishing websites (e.g., websites that are not included in a VPN application's blacklist).

SUMMARY

As will be described in greater detail below, the present disclosure describes various systems and methods for identifying and mitigating phishing attacks.

In one example, a method for identifying and mitigating phishing attacks may include (i) receiving a request for sensitive data utilized to access a network servicenetwork service, (ii) launching an autofill provider for providing the sensitive data to the network servicenetwork service, (iii) identifying, utilizing the autofill provider, a domain for the network servicenetwork service and a data type associated with the sensitive data utilized to access the network servicenetwork service, (iv) determining, utilizing the autofill provider, a reputation for the network servicenetwork service based on the domain and the data type, and (v) performing a security action that protects against a phishing attack based on the reputation determined for the network servicenetwork service.

In some examples, the security action may include generating a phishing risk alert based on the reputation determined for the network servicenetwork service. Additionally or alternatively, the security action may include sending random data to the network servicenetwork service in response to a request for the sensitive data when the phishing risk alert is high. Additionally or alternatively, the security action may include sending random data to the network servicenetwork service in response to a request for the sensitive data when the phishing risk alert is unknown.

In some embodiments, the sensitive data may be received as a request for a password to login to the network servicenetwork service. In some examples, the autofill provider may be launched by (i) receiving a selection of the autofill provider from an autofill framework in a computing device operating system and (ii) calling, from the autofill framework, an application programming interface to launch the autofill provider.

In some examples, the domain for the network servicenetwork service and the data type associated with the sensitive data may be identified by (i) identifying a uniform resource locator (URL) associated with the network servicenetwork service and (ii) identifying an authentication data type describing login credentials utilized to access the network servicenetwork service.

In some embodiments, the reputation for the network servicenetwork service may be determined by (i) checking the domain and the data type against a list comprising a plurality of domains and data types having assigned reputations in one or more reputation databases and (ii) determining a reputation for the network servicenetwork service based on the domain and the data type matching at least one of the domains and data types in the list. Additionally or alternatively, the reputation for the network servicenetwork service may be determined by (i) checking the domain and the data type against a list comprising a plurality of domains and data types having assigned reputations in one or more reputation databases and (ii) determining a reputation for the network servicenetwork service based on the domain and the data type not matching any of the domains and data types in the list. In some examples, the network servicenetwork service may include a website or a mobile device web application.

In one embodiment, a system for identifying and mitigating phishing attacks may include at least one physical processor and physical memory that includes a set of modules and computer-executable instructions that, when executed by the physical processor, cause the physical processor to (i) receive, by a receiving module, a request for sensitive data utilized to access a network service, (ii) launch, by a launch module, an autofill provider for providing the sensitive data to the network service, (iii) identify, by an identification module utilizing the autofill provider, a domain for the network service and a data type associated with the sensitive data utilized to access the network service, (iv) determine, by a determining module utilizing the autofill provider, a reputation for the network service based on the domain and the data type, and (v) perform, by a security module, a security action that protects against a phishing attack based on the reputation determined for the network service.

In some examples, the above-described method may be encoded as computer-readable instructions on a non-transitory computer-readable medium. For example, a computer-readable medium may include one or more computer-executable instructions that, when executed by at least one processor of a computing device, may cause the computing device to (i) receive a request for sensitive data utilized to access a network service, (ii) launch an autofill provider for providing the sensitive data to the network service, (iii) identify, utilizing the autofill provider, a domain for the network service and a data type associated with the sensitive data utilized to access the network service, (iv) determine, utilizing the autofill provider, a reputation for the network service based on the domain and the data type, and (v)

perform a security action that protects against a phishing attack based on the reputation determined for the network service.

Features from any of the embodiments described herein may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of example embodiments and are a part of the specification. Together with the following description, these drawings demonstrate and explain various principles of the present disclosure.

Throughout the drawings, identical reference characters and descriptions indicate similar, but not necessarily identical, elements. While the example embodiments described herein are susceptible to various modifications and alternative forms, specific embodiments have been shown by way of example in the drawings and will be described in detail herein. However, the example embodiments described herein are not intended to be limited to the particular forms disclosed. Rather, the present disclosure covers all modifications, equivalents, and alternatives falling within the scope of the appended claims.

DETAILED DESCRIPTION OF EXAMPLE EMBODIMENTS

The present disclosure is generally directed to systems and methods for identifying and mitigating phishing attacks.

As will be described in greater detail below, the systems and methods described herein may utilize an on-demand mobile computing device autofill provider that may be initiated upon a request for sensitive data being received by a network service and that determines a reputation of the network service based on the network service's domain and the type of data (e.g., login data) requested. By utilizing the autofill provider in this way, the systems and methods described herein may provide on-demand detection of phishing websites or web applications providing the network service based on the determined reputation, thereby preventing phishing attacks by the network service against users of mobile computing devices without relying on continuous data traffic monitoring utilized by conventional techniques, such as virtual private network (VPN) applications and mobile device operating system accessibility services.

In addition, the systems and methods described herein may improve the operation of mobile computing devices by increasing battery performance as compared to resource intensive "always-on" traffic monitoring services (such as VPN) utilized by traditional techniques for detecting phishing attacks. Moreover, the systems and methods described herein may further improve the technical field of mobile computing device security by providing an autofill provider capable of protecting against phishing attacks by previously unknown sources (e.g., websites) that may be undetectable utilizing conventional techniques such as VPN.

Figure 1:
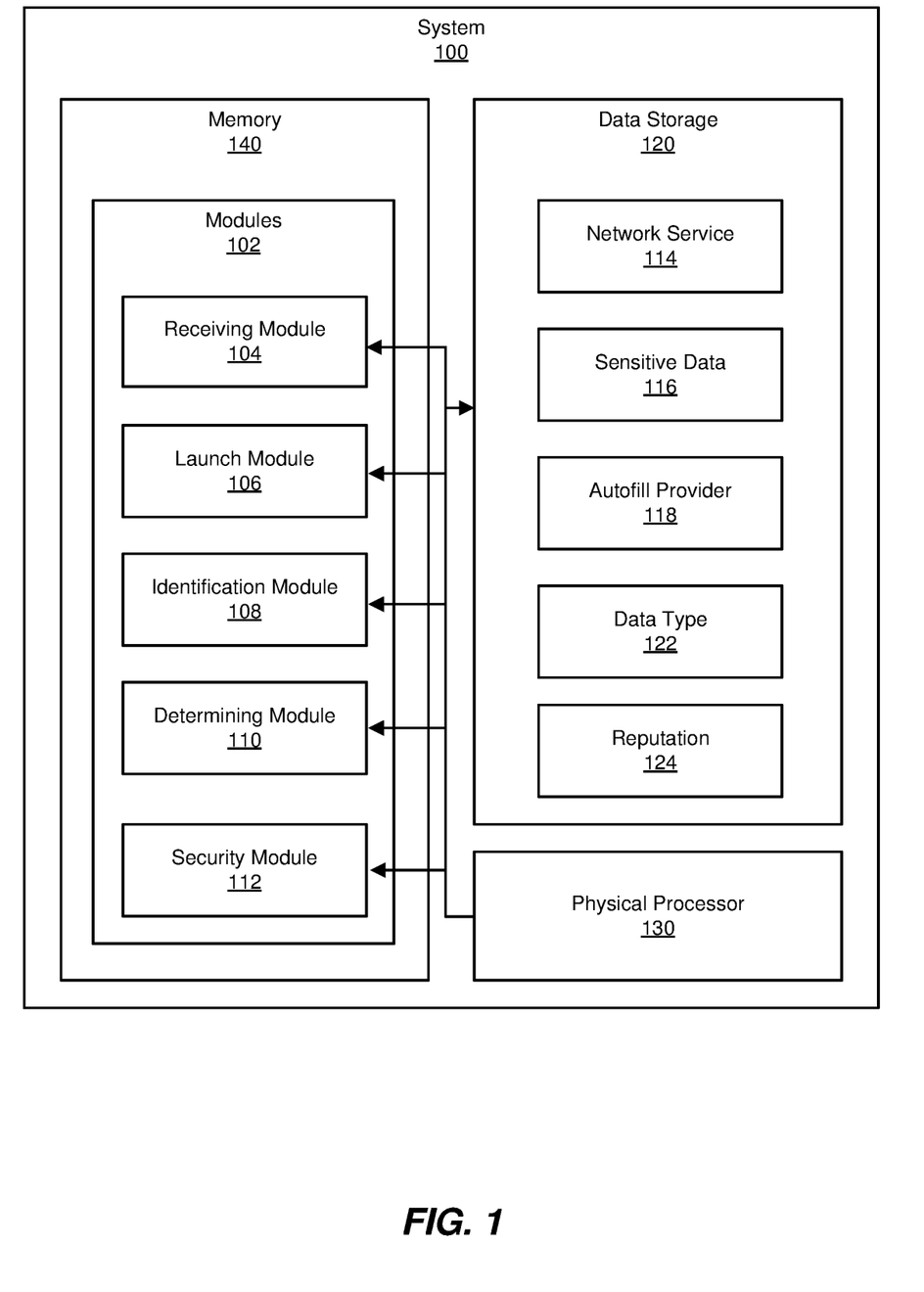
FIG. 1 is a block diagram of an example system for identifying and mitigating phishing attacks.
Figure 2:
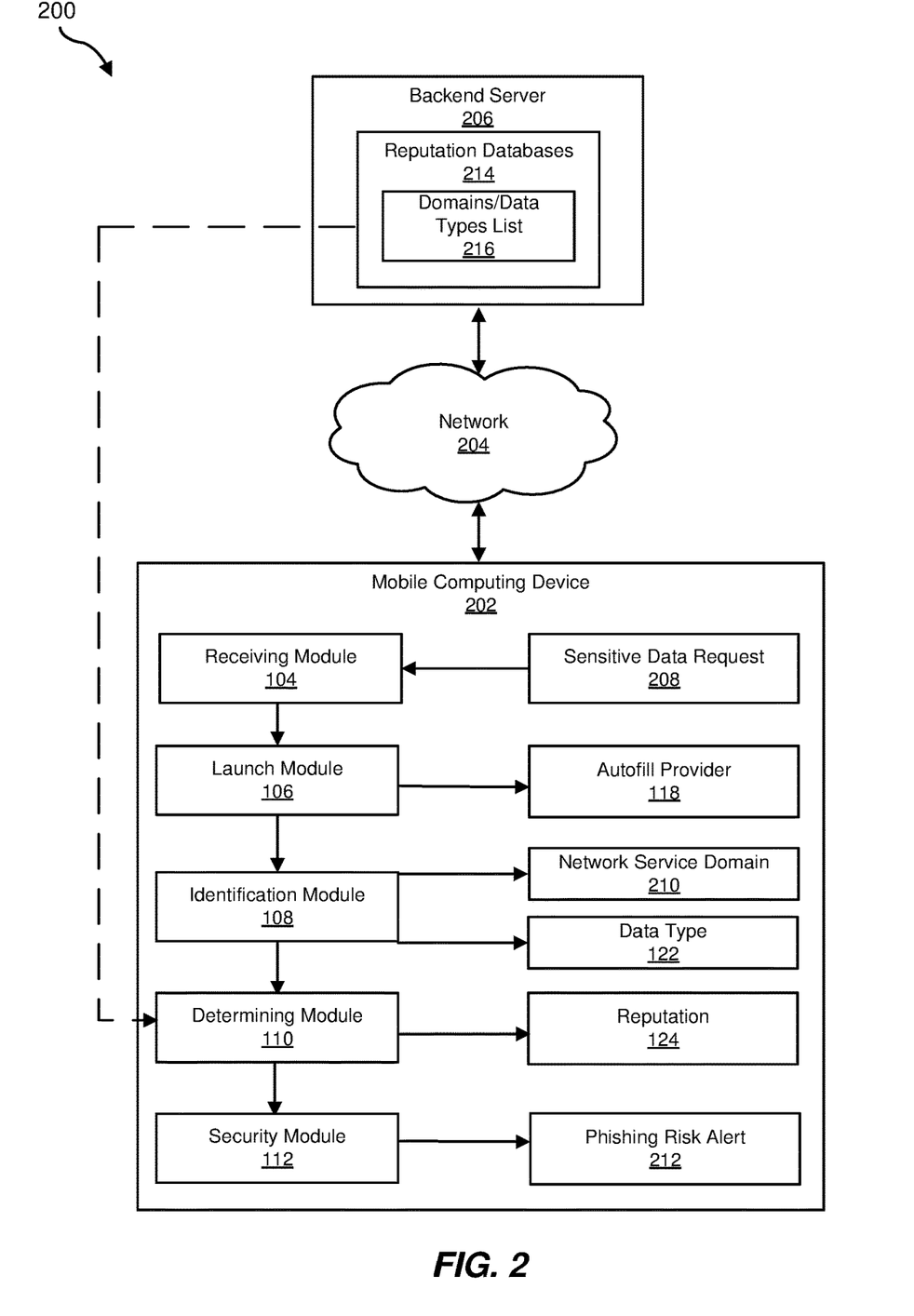
FIG. 2 is a block diagram of an additional example system for identifying and mitigating phishing attacks.

The following will provide, with reference to FIGS. 1-2, detailed descriptions of example systems for identifying and mitigating phishing attacks. Detailed descriptions of corresponding computer-implemented methods will also be provided in connection with FIG. 3. Detailed descriptions of example user interfaces that may be generated by example systems for identifying and mitigating phishing attacks will be also be provided in connection with FIGS. 4-5. In addition, detailed descriptions of an example computing system and network architecture capable of implementing one or more of the embodiments described herein will be provided in connection with FIGS. 6 and 7, respectively.

FIG. 1 is a block diagram of an example system 100 for identifying and mitigating phishing attacks. As illustrated in this figure, example system 100 may include one or more modules 102 for performing one or more tasks. For example, and as will be explained in greater detail below, example system 100 may include a receiving module 104 that receives a request for sensitive data 116 utilized to access a network service 114. Example system 100 may additionally include a launch module 106 that launches an autofill provider 118 for providing sensitive data 116 to network service 114. Example system 100 may also include an identification module 108 that identifies, utilizing autofill provider 118, a domain for network service 114 and a data type 122 associated with sensitive data 116 utilized to access network service 114. Example system 100 may additionally include a determination module 110 that determines, utilizing autofill provider 118, a reputation 124 associated with a likelihood of a phishing attack being initiated by network service 114 based on the domain and data type 122. Example system 100 may also include a security module 112 that performs a security action that protects against the phishing attack based on reputation 124 determined for network service 114. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent modules stored and configured to run on one or more computing devices, such as the devices illustrated in FIG. 2 (e.g., mobile computing device 202). One or more of modules 102 in FIG. 1 may also represent all or portions of one or more special-purpose computers configured to perform one or more tasks.

As illustrated in FIG. 1, example system 100 may also include one or more memory devices, such as memory 140. Memory 140 generally represents any type or form of volatile or non-volatile storage device or medium capable of storing data and/or computer-readable instructions. In one example, memory 140 may store, load, and/or maintain one or more of modules 102. Examples of memory 140 include, without limitation, Random Access Memory (RAM), Read Only Memory (ROM), flash memory, Hard Disk Drives (HDDs), Solid-State Drives (SSDs), optical disk drives, caches, variations or combinations of one or more of the same, and/or any other suitable storage memory.

As illustrated in FIG. 1, example system 100 may also include one or more physical processors, such as physical processor 130. Physical processor 130 generally represents any type or form of hardware-implemented processing unit capable of interpreting and/or executing computer-readable instructions. In one example, physical processor 130 may access and/or modify one or more of modules 102 stored in memory 140. Additionally or alternatively, physical processor 130 may execute one or more of modules 102 to facilitate identifying and mitigating phishing attacks. Examples of physical processor 130 include, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, and/or any other suitable physical processor.

As illustrated in FIG. 1, example system 100 may also include a data storage 120 for storing data. In one example, data storage 120 may store network service 114, sensitive data 116, autofill provider 118, data type 122, and reputation 124.

Example system 100 in FIG. 1 may be implemented in a variety of ways. For example, all or a portion of example system 100 may represent portions of example system 200 in FIG. 2. As shown in FIG. 2, system 200 may include a mobile computing device 202 in communication with a backend server 206 via a network 204. In one example, all or a portion of the functionality of modules 102 may be performed by mobile computing device 202, backend server 206, and/or any other suitable computing system. As will be described in greater detail below, one or more of modules 102 from FIG. 1 may, when executed by at least one processor of mobile computing device 202, enable mobile computing device 202 to identify and mitigate phishing attacks.

For example, receiving module 104 may receive a sensitive data request 208 for sensitive data utilized to access a network service. Next, launch module 106 may launch autofill provider 118 for providing the requested sensitive data to the network service. Then identification module 108 may utilize autofill provider 118 to identify network service domain 210 and data type 122 associated with the sensitive data utilized to access the network service. Then, determining module 110 may utilize autofill provider 118 to determine a reputation 124, by accessing reputation databases 214 on backend server 206 to check domains/data types list 216, to determine a likelihood of a phishing attack being initiated by the network service based on network service domain 210 and data type 122. Finally, security module 112 may perform a security action that protects against a phishing attack by generating a phishing risk alert 212 based on reputation 124.

Mobile computing device 202 generally represents any type or form of computing device capable of reading computer-executable instructions. In some examples, mobile computing device 202 may represent an endpoint device such as a smartphone or multi-purpose mobile computing device running an operating system including an autofill framework for use by one or more autofill providers to prefill form data utilized for accessing network services. Additional examples of mobile computing device 202 include, without limitation, laptops, tablets, desktops, servers, cellular phones, Personal Digital Assistants (PDAs), multimedia players, embedded systems, wearable devices (e.g., smart watches, smart glasses, etc.), smart vehicles, smart packaging (e.g., active or intelligent packaging), gaming consoles, so-called Internet-of-Things devices (e.g., smart appliances, etc.), variations or combinations of one or more of the same, and/or any other suitable computing device.

Backend server 206 generally represents any type or form of computing device that is capable of capable of reading computer-executable instructions. In some examples, backend server 206 may be a cloud-based reputation server for maintaining reputation data for websites in view of one or more potential security threats (e.g., phishing). Additional examples of backend server 206 include, without limitation, security servers, application servers, web servers, storage servers, and/or database servers configured to run certain software applications and/or provide various security, web, storage, and/or database services. Although illustrated as a single entity in FIG. 2, backend server 206 may include and/or represent a plurality of servers that work and/or operate in conjunction with one another.

Network 204 generally represents any medium or architecture capable of facilitating communication or data transfer. In one example, network 204 may facilitate communication between mobile computing device 202 and backend server 206. In this example, network 204 may facilitate communication or data transfer using wireless and/or wired connections. Examples of network 204 include, without limitation, an intranet, a Wide Area Network (WAN), a Local Area Network (LAN), a Personal Area Network (PAN), the Internet, Power Line Communications (PLC), a cellular network (e.g., a Global System for Mobile Communications (GSM) network), portions of one or more of the same, variations or combinations of one or more of the same, and/or any other suitable network.

Figure 3:
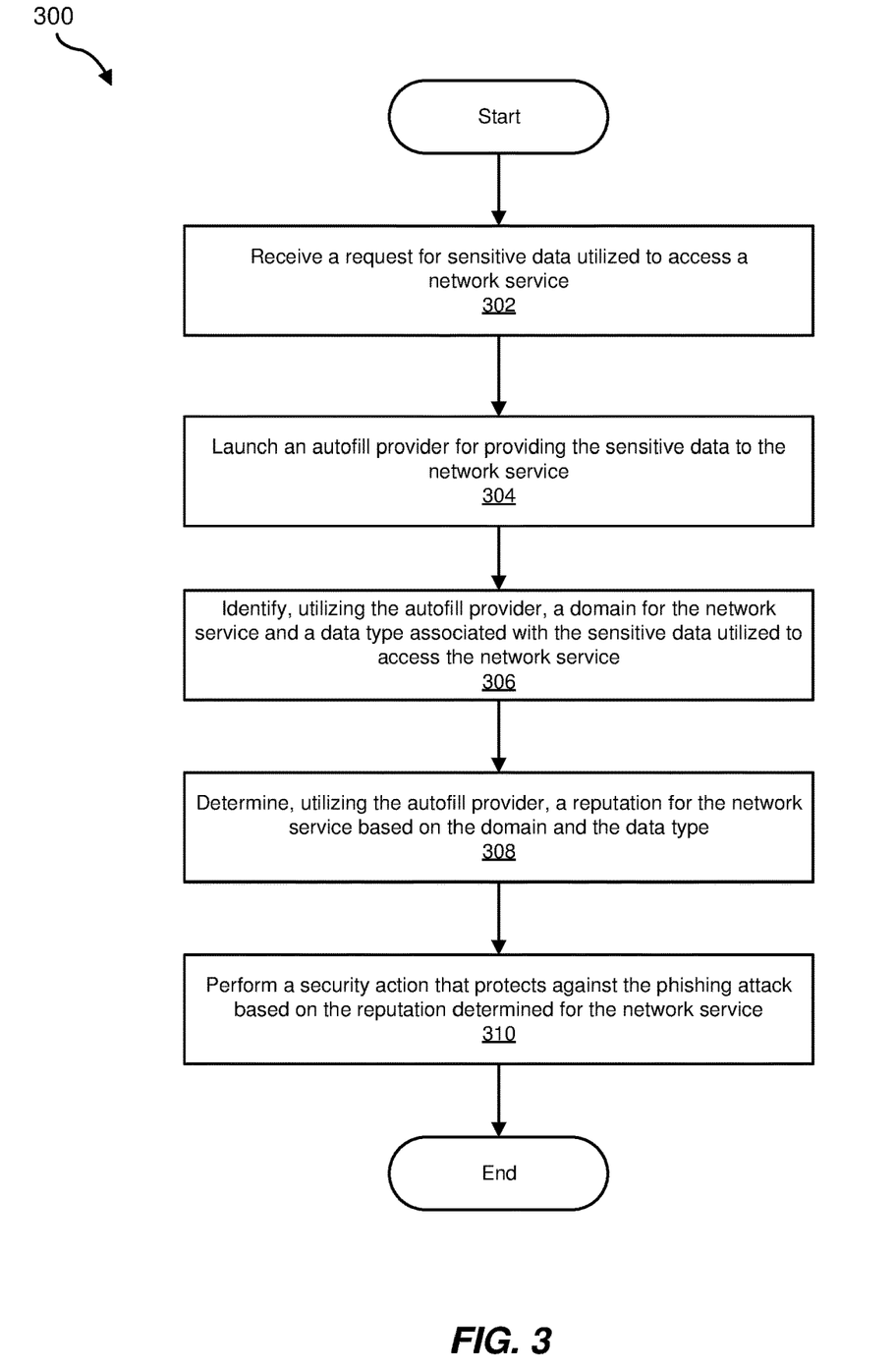
FIG. 3 is a flow diagram of an example method for identifying and mitigating phishing attacks.

FIG. 3 is a flow diagram of an example computer-implemented method 300 for identifying and mitigating phishing attacks. The steps shown in FIG. 3 may be performed by any suitable computer-executable code and/or computing system, including system 100 in FIG. 1, system 200 in FIG. 2, and/or variations or combinations of one or more of the same. In one example, each of the steps shown in FIG. 3 may represent an algorithm whose structure includes and/or is represented by multiple sub-steps, examples of which will be provided in greater detail below.

As illustrated in FIG. 3, at step 302 one or more of the systems described herein may receive a request for sensitive data utilized to access a network service. For example, receiving module 104 may, as part of mobile computing device 202 in FIG. 2, receive sensitive data request 208 for sensitive data 116 utilized to access network service 114.

The term "sensitive data" as used herein, generally refers to private or personal user data for accessing one or more services provided over a computing network (e.g., the Internet). Examples of sensitive data may include authentication credentials such as user names and passwords for accessing various services including, without limitation, social networking services, banking services, electronic mail services, electronic commerce (e.g., online shopping) services, etc.

The term "network service" as used herein, generally refers to any website, web application, native computing device application (e.g., a mobile computing device application), etc. that may be configured to run on a computing device operating system and that requests user input for sensitive data. In some examples, a network service may provide a user interface for requesting sensitive data to authenticate users prior to accessing features and/or services associated with the network service.

Receiving module 104 may receive sensitive data request 208 for sensitive data 116 utilized to access network service 114 in a variety of ways. In some embodiments, receiving module 104 may receive a request for authentication credentials associated with logging into network service 114. For example, a banking website (or alternatively, a mobile device banking application) may request a user name and/or a password prior to logging in a user for accessing online banking services.

At step 304, one or more of the systems described herein may launch an autofill provider for providing the sensitive data requested at step 302 to the network service. For example, launch module 106 may, as part of mobile computing device 202 in FIG. 2, launch autofill provider 118 for providing sensitive data 116 to network service 114.

The term "autofill provider" as used herein, generally refers to an application utilized in conjunction with a mobile device operating system framework configured to enable users to automatically complete input fields with pre-stored information utilized by various mobile computing device applications. In some examples, an autofill provider application may declare itself as a provider to the framework, after which the framework will request the autofill provider application for the stored information. For example, an autofill provider application may automatically populate pre-stored user login credentials in the login input field of a mobile device banking application requesting a user name and password to access banking services.

Launch module 106 may launch autofill provider 118 in a variety of ways. In some embodiments, launch module 106 may receive a selection of autofill provider 118 from an autofill framework in an operating system for the mobile computing device 202 and then call, from the autofill framework, an application programming interface to launch autofill provider 118. In some examples, the operating system may present the user with an option to launch the selected autofill provider 118 in a user interface (e.g., a user may select a key icon above a keyboard to launch autofill provider 118).

At step 306, one or more of the systems described herein may identify, utilizing the autofill provider launched at step 304, a domain for the network service and a data type associated with the sensitive data utilized to access the network service. For example, identification module 108 may, as part of mobile computing device 202 in FIG. 2, identify network service domain 210 for network service 114 and data type 122 associated with sensitive data 116 for accessing network service 114.

Identification module 108 may identify network service domain 210 and data type 122 in a variety of ways. In some embodiments, identification module 108 may identify a uniform resource locator (URL) associated with network service 114 and identify an authentication data type describing login credentials utilized to access network service 114. For example, identification module 108 may identify the URL for a social networking network service based on a website address in a browser displaying a login screen for accessing the service on mobile computing device 202 and further determine that the login credentials (e.g., username and password) requested for accessing the social networking website is data type 122.

At step 308, one or more of the systems described herein may determine, utilizing the autofill provider, a reputation for the network service based on the domain and the data type identified at step 306. For example, determination module 110 may, as part of mobile computing device 202 in FIG. 2, determine, utilizing autofill provider 118, reputation 124 for network service 114 based on network service domain 210 and data type 122.

Determining module 110 may determine reputation 124 for network service 114 in a variety of ways. In some embodiments, determining module 110 may determine reputation 124 by checking network service domain 210 and data type 122 against domains/data types list 216 in reputation databases 214 on backend server 206. Then, determining module 110 may determine reputation 124 for network service 114 based on network service domain 210 and data type 122 matching at least one of the domains and data types in domains/data types list 216. For example, network service 114 may have the domain "bankofexamples.com" which is a fraudulent domain for a phishing website intended to capture an unsuspecting user's login credentials for a legitimate website having the domain "bankofexample.com." In this example, when the fraudulent domain "bankofexamples.com" and the data type of login credentials are checked against domains/data types list 216 in reputation databases 214 which identifies "bankofexamples.com" as being a known phishing website, determining module 110 may determine a match and thus reputation 124 indicates that that there is a high likelihood of network service 114 initiating a phishing attack on mobile computing device 202. In other embodiments, determining module 110 may determine reputation 124 for network service 114 based on network service domain 210 and data type 122 not matching any of the domains and data types in domains/data types list 216. For example, network service 114 may have the domain "unkownwebsite.com" which does not match any of the domains and/or data types in domains/data types list 216 in reputation databases 214. Thus, in this example, determining module 110 may determine that reputation 124 for network service 114 is unknown and there may be a moderate likelihood of network service 114 initiating a phishing attack on mobile computing device 202. In yet other embodiments, determining module 110 may determine reputation 124 for network service 114 based on network service domain 210 and data type 122 matching one or more legitimate domains (e.g., corresponding to non-fraudulent websites) in domains/data types list 216. Thus, in these embodiments, determining module 110 may determine that reputation 124 indicates that there is a low or no likelihood of network service 114 initiating a phishing attack on mobile computing device 202.

At step 310, one or more of the systems described herein may perform a security action that protects against the phishing attack based on the reputation determined for the network service at step 308. For example, security module 112 may, as part of mobile computing device 202 in FIG. 2, perform a security action that protects against a phishing attack based on reputation 124 determined for network service 114.

Security module 112 may perform a security action in a variety of ways. In some embodiments, security module 112 may generate phishing risk alert 212 based on reputation 124 determined for network service 114. For example, security module 112 may instruct autofill provider 118 to display a "high" phishing risk alert on mobile computing device 202 when there is a match between network service domain 210 and data type 122 for network service 114 and known phishing website domains and data types (e.g., blacklisted domains) in domains/data types list 216 in reputation databases 214. In other examples, security module 112 may instruct autofill provider 118 to display a "low" phishing risk alert on mobile computing device 202 when there is a match between network service domain 210 and data type 122 for network service 114 and known non-fraudulent domains and datatypes (e.g., whitelisted domains) in domains/data types list 216 in reputation databases 214. In still other examples, security module 112 may instruct autofill provider 118 to display an "unknown" phishing risk alert on mobile computing device 202 when network service domain 210 and data type 122 for network service 114 does not appear in domains/data types list 124 in reputation databases 214. Additionally, in some embodiments, security module 112 may be configured to send random data to network service 114 in response to sensitive data request 208 upon generating either a high or unknown phishing risk alert on mobile computing device 202.

Figure 4:
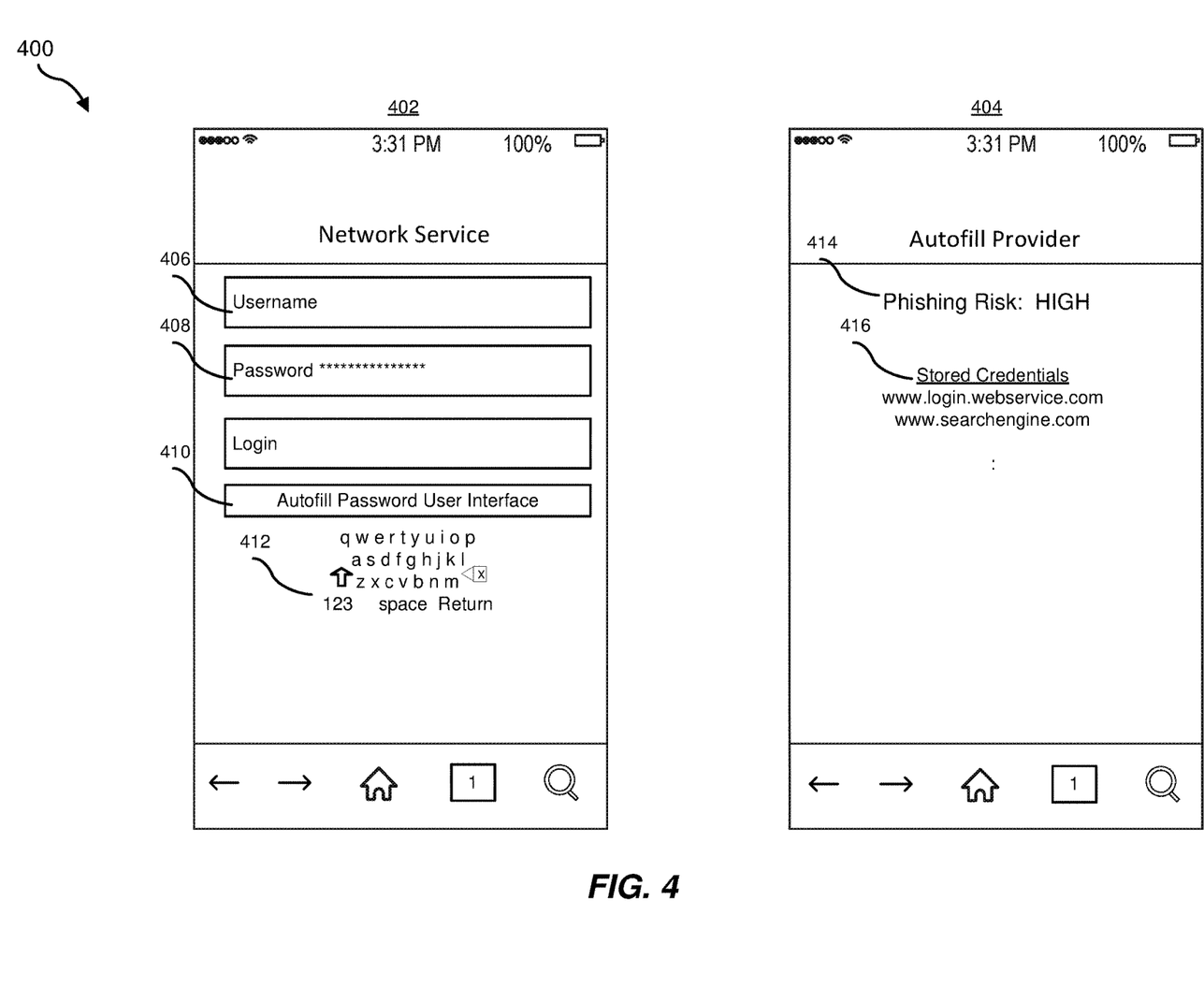
FIG. 4 is a block diagram of example user interfaces that may be generated by example systems for identifying and mitigating phishing attacks.

FIG. 4 Is a block diagram of example user interfaces 400 that may be generated by example systems for identifying and mitigating phishing attacks. In some embodiments, example user interfaces 400 may include user interface 402 and user interface 404.

In some examples, user interface 402 may be a network service user interface for receiving login credentials, including username 406 and password 408 (e.g., sensitive data), for accessing a network service. User interface 402 may further include an autofill user interface 410, which may be generated by an autofill provider (e.g., autofill provider 118 of FIGS. 1 and 2) for automatically entering password 408 in lieu of manually entering password 408 using onscreen keyboard 412. As discussed above with respect to steps 306 and 308 of FIG. 3, autofill provider 118 may identify a domain for the network service and a data type associated with the sensitive data utilized to access the network service and further determine a reputation for the network service based on the domain and the data type.

In some examples, user interface 404 may be display a phishing risk alert 414 generated by an autofill provider upon the autofill provider determining that the network service of user interface 402 has a high phishing risk. For example, autofill provider may determine that a domain and data type identified for the network service matches a domain and data type for a known phishing website in a reputation database. The identification of the autofill provider selected and utilized to generate phishing risk alert 414 may be a stored credential 416 (e.g., www.login.webservice.com).

Figure 5:
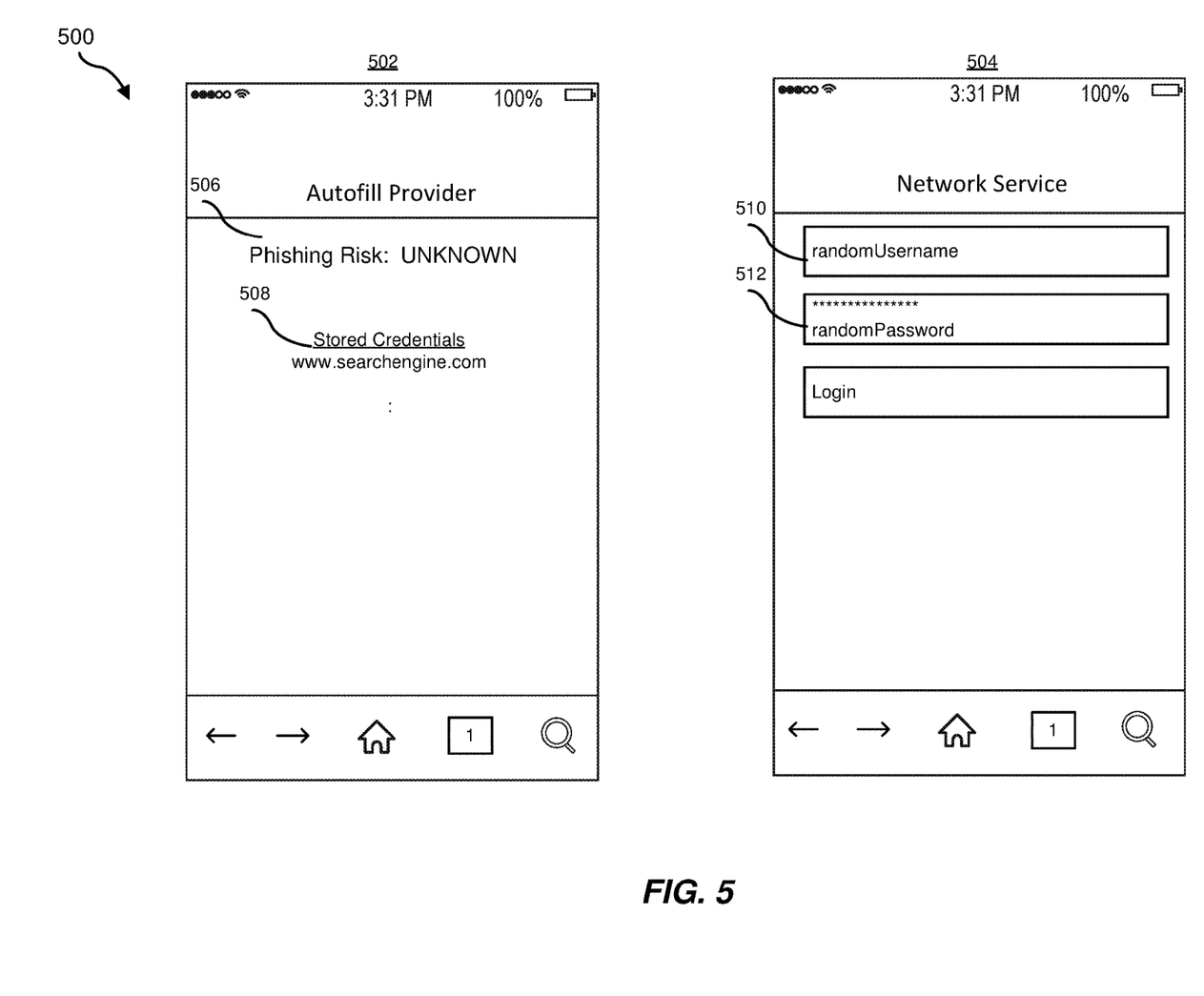
FIG. 5 is a block diagram of additional example user interfaces that may be generated by example systems for identifying and mitigating phishing attacks.

FIG. 5 Is a block diagram of example user interfaces 500 that may be generated by example systems for identifying and mitigating phishing attacks. In some embodiments, example user interfaces 400 may include user interface 502 and user interface 504.

In some examples, user interface 502 may be display a phishing risk alert 506 generated by an autofill provider (e.g., autofill provider 118 of FIGS. 1 and 2) upon the autofill provider determining that a network service has an unknown phishing risk, as discussed above with respect to step 308 of FIG. 3. For example, the autofill provider may determine that a domain and data type identified for the network service does not match (e.g., does not appear) in a reputation database. The identification of the autofill provider selected and utilized to generate phishing risk alert 506 may be a stored credential 508 (e.g., www.searchengine.com).

In some examples, user interface 504 may be a network service user interface in which an autofill provider has generated random credentials (e.g., a random username 510 and a random password 512) for accessing network service determined to have a high or unknown phishing risk. By generating the random credentials, the autofill provider ensures that a user's legitimate login credentials are not captured by a known (or potential) fraudulent network service such as a phishing website.

As explained in connection with method 300 above, the systems and methods described herein provide for identifying and mitigating phishing attacks on mobile platforms. By utilizing a mobile device autofill framework, the systems described herein may receive network service requests for a user to input sensitive data and forward the request to a customized autofill provider (e.g., a security password manager service provider). The autofill provider may then determine what to return to the requesting service. The autofill provider may then analyze the reputation of the requesting service by its domain (and requested data type) and return the result as a hint to a user via the framework. The autofill provider is only invoked on demand thereby avoiding privacy concerns, batter cost, and performance impact issues associated with conventional techniques such as VPN traffic monitoring.

Figure 6:
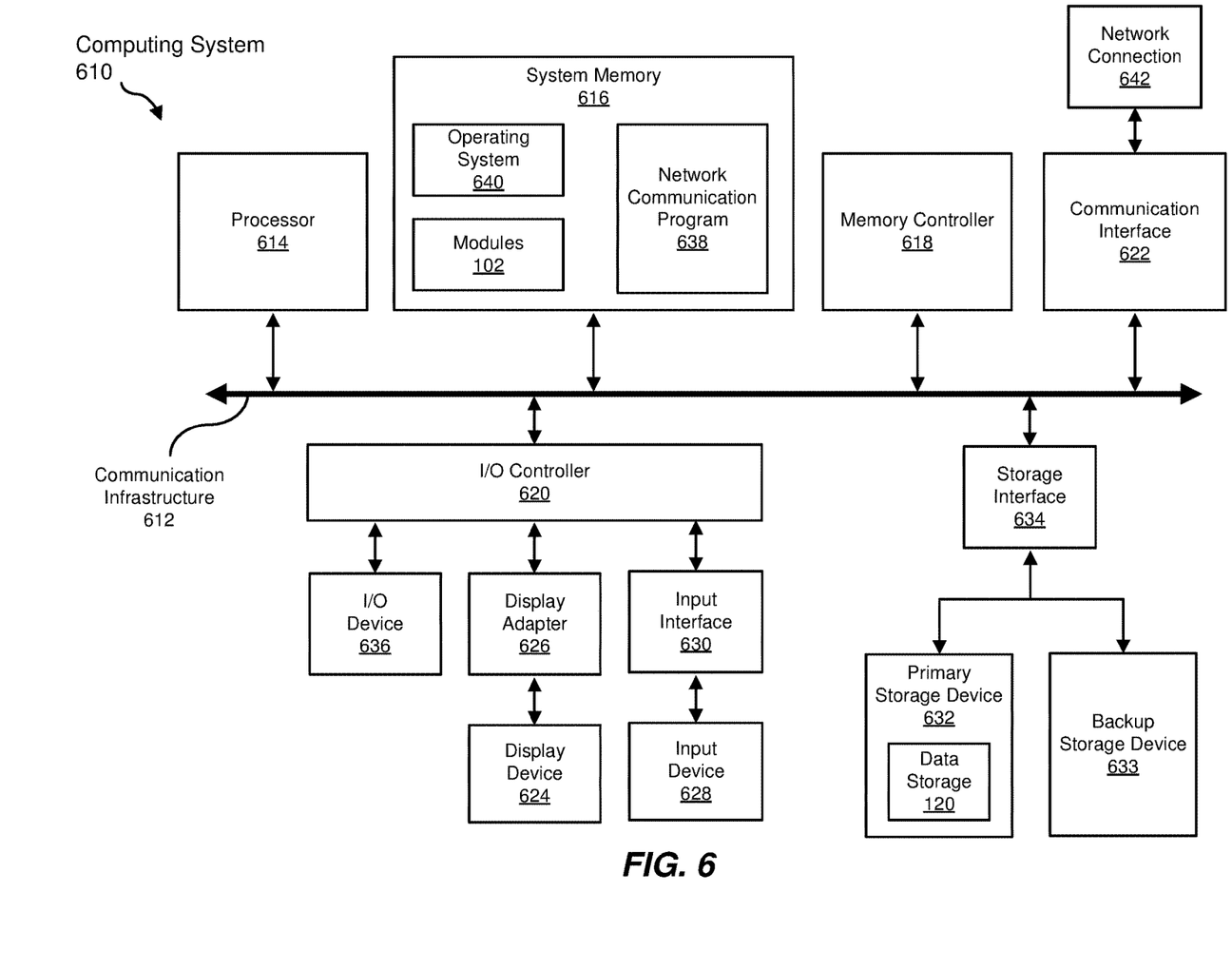
FIG. 6 is a block diagram of an example computing system capable of implementing one or more of the embodiments described and/or illustrated herein.

FIG. 6 is a block diagram of an example computing system 610 capable of implementing one or more of the embodiments described and/or illustrated herein. For example, all or a portion of computing system 610 may perform and/or be a means for performing, either alone or in combination with other elements, one or more of the steps described herein (such as one or more of the steps illustrated in FIG. 3). All or a portion of computing system 610 may also perform and/or be a means for performing any other steps, methods, or processes described and/or illustrated herein.

Computing system 610 broadly represents any single or multi-processor computing device or system capable of executing computer-readable instructions. Examples of computing system 610 include, without limitation, workstations, laptops, client-side terminals, servers, distributed computing systems, handheld devices, or any other computing system or device. In its most basic configuration, computing system 610 may include at least one processor 614 and a system memory 616.

Processor 614 generally represents any type or form of physical processing unit (e.g., a hardware-implemented central processing unit) capable of processing data or interpreting and executing instructions. In certain embodiments, processor 614 may receive instructions from a software application or module. These instructions may cause processor 614 to perform the functions of one or more of the example embodiments described and/or illustrated herein.

System memory 616 generally represents any type or form of volatile or non-volatile storage device or medium capable of storing data and/or other computer-readable instructions. Examples of system memory 616 include, without limitation, Random Access Memory (RAM), Read Only Memory (ROM), flash memory, or any other suitable memory device. Although not required, in certain embodiments computing system 610 may include both a volatile memory unit (such as, for example, system memory 616) and a non-volatile storage device (such as, for example, primary storage device 632, as described in detail below). In one example, one or more of modules 102 from FIG. 1 may be loaded into system memory 616.

In some examples, system memory 616 may store and/or load an operating system 640 for execution by processor 614. In one example, operating system 640 may include and/or represent software that manages computer hardware and software resources and/or provides common services to computer programs and/or applications on computing system 610. Examples of operating system 640 include, without limitation, LINUX, JUNOS, MICROSOFT WINDOWS, WINDOWS MOBILE, MAC OS, APPLE'S 10S, UNIX, GOOGLE CHROME OS, GOOGLE'S ANDROID, SOLARIS, variations of one or more of the same, and/or any other suitable operating system.

In certain embodiments, example computing system 610 may also include one or more components or elements in addition to processor 614 and system memory 616. For example, as illustrated in FIG. 6, computing system 610 may include a memory controller 618, an Input/Output (I/O) controller 620, and a communication interface 622, each of which may be interconnected via a communication infrastructure 612. Communication infrastructure 612 generally represents any type or form of infrastructure capable of facilitating communication between one or more components of a computing device. Examples of communication infrastructure 612 include, without limitation, a communication bus (such as an Industry Standard Architecture (ISA), Peripheral Component Interconnect (PCI), PCI Express (PCIe), or similar bus) and a network.

Memory controller 618 generally represents any type or form of device capable of handling memory or data or controlling communication between one or more components of computing system 610. For example, in certain embodiments memory controller 618 may control communication between processor 614, system memory 616, and I/O controller 620 via communication infrastructure 612.

I/O controller 620 generally represents any type or form of module capable of coordinating and/or controlling the input and output functions of a computing device. For example, in certain embodiments I/O controller 620 may control or facilitate transfer of data between one or more elements of computing system 610, such as processor 614, system memory 616, communication interface 622, display adapter 626, input interface 630, and storage interface 634.

As illustrated in FIG. 6, computing system 610 may also include at least one display device 624 coupled to I/O controller 620 via a display adapter 626. Display device 624 generally represents any type or form of device capable of visually displaying information forwarded by display adapter 626. Similarly, display adapter 626 generally represents any type or form of device configured to forward graphics, text, and other data from communication infrastructure 612 (or from a frame buffer, as known in the art) for display on display device 624.

As illustrated in FIG. 6, example computing system 610 may also include at least one input device 628 coupled to I/O controller 620 via an input interface 630. Input device 628 generally represents any type or form of input device capable of providing input, either computer or human generated, to example computing system 610. Examples of input device 628 include, without limitation, a keyboard, a pointing device, a speech recognition device, variations or combinations of one or more of the same, and/or any other input device.

Additionally or alternatively, example computing system 610 may include additional I/O devices. For example, example computing system 610 may include I/O device 636. In this example, I/O device 636 may include and/or represent a user interface that facilitates human interaction with computing system 610. Examples of I/O device 636 include, without limitation, a computer mouse, a keyboard, a monitor, a printer, a modem, a camera, a scanner, a microphone, a touchscreen device, variations or combinations of one or more of the same, and/or any other I/O device.

Communication interface 622 broadly represents any type or form of communication device or adapter capable of facilitating communication between example computing system 610 and one or more additional devices. For example, in certain embodiments communication interface 622 may facilitate communication between computing system 610 and a private or public network including additional computing systems. Examples of communication interface 622 include, without limitation, a wired network interface (such as a network interface card), a wireless network interface (such as a wireless network interface card), a modem, and any other suitable interface. In at least one embodiment, communication interface 622 may provide a direct connection to a remote server via a direct link to a network, such as the Internet. Communication interface 622 may also indirectly provide such a connection through, for example, a local area network (such as an Ethernet network), a personal area network, a telephone or cable network, a cellular telephone connection, a satellite data connection, or any other suitable connection.

In certain embodiments, communication interface 622 may also represent a host adapter configured to facilitate communication between computing system 610 and one or more additional network or storage devices via an external bus or communications channel. Examples of host adapters include, without limitation, Small Computer System Interface (SCSI) host adapters, Universal Serial Bus (USB) host adapters, Institute of Electrical and Electronics Engineers (IEEE) 1394 host adapters, Advanced Technology Attachment (ATA), Parallel ATA (PATA), Serial ATA (SATA), and External SATA (eSATA) host adapters, Fibre Channel interface adapters, Ethernet adapters, or the like. Communication interface 622 may also allow computing system 610 to engage in distributed or remote computing. For example, communication interface 622 may receive instructions from a remote device or send instructions to a remote device for execution.

In some examples, system memory 616 may store and/or load a network communication program 638 for execution by processor 614. In one example, network communication program 638 may include and/or represent software that enables computing system 610 to establish a network connection 642 with another computing system (not illustrated in FIG. 6) and/or communicate with the other computing system by way of communication interface 622. In this example, network communication program 638 may direct the flow of outgoing traffic that is sent to the other computing system via network connection 642. Additionally or alternatively, network communication program 638 may direct the processing of incoming traffic that is received from the other computing system via network connection 642 in connection with processor 614.

Although not illustrated in this way in FIG. 6, network communication program 638 may alternatively be stored and/or loaded in communication interface 622. For example, network communication program 638 may include and/or represent at least a portion of software and/or firmware that is executed by a processor and/or Application Specific Integrated Circuit (ASIC) incorporated in communication interface 622.

As illustrated in FIG. 6, example computing system 610 may also include a primary storage device 632 and a backup storage device 633 coupled to communication infrastructure 612 via a storage interface 634. Storage devices 632 and 633 generally represent any type or form of storage device or medium capable of storing data and/or other computer-readable instructions. For example, storage devices 632 and 633 may be a magnetic disk drive (e.g., a so-called hard drive), a solid state drive, a floppy disk drive, a magnetic tape drive, an optical disk drive, a flash drive, or the like. Storage interface 634 generally represents any type or form of interface or device for transferring data between storage devices 632 and 633 and other components of computing system 610. In one example, data storage 120 from FIG. 1 may be stored and/or loaded in primary storage device 632.

In certain embodiments, storage devices 632 and 633 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 632 and 633 may also include other similar structures or devices for allowing computer software, data, or other computer-readable instructions to be loaded into computing system 610. For example, storage devices 632 and 633 may be configured to read and write software, data, or other computer-readable information. Storage devices 632 and 633 may also be a part of computing system 610 or may be a separate device accessed through other interface systems.

Many other devices or subsystems may be connected to computing system 610. Conversely, all of the components and devices illustrated in FIG. 6 need not be present to practice the embodiments described and/or illustrated herein. The devices and subsystems referenced above may also be interconnected in different ways from that shown in FIG. 6. Computing system 610 may also employ any number of software, firmware, and/or hardware configurations. For example, one or more of the example embodiments disclosed herein may be encoded as a computer program (also referred to as computer software, software applications, computer-readable instructions, or computer control logic) on a computer-readable medium. The term "computer-readable medium," as used herein, generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The computer-readable medium containing the computer program may be loaded into computing system 610. All or a portion of the computer program stored on the computer-readable medium may then be stored in system memory 616 and/or various portions of storage devices 632 and 633. When executed by processor 614, a computer program loaded into computing system 610 may cause processor 614 to perform and/or be a means for performing the functions of one or more of the example embodiments described and/or illustrated herein. Additionally or alternatively, one or more of the example embodiments described and/or illustrated herein may be implemented in firmware and/or hardware. For example, computing system 610 may be configured as an Application Specific Integrated Circuit (ASIC) adapted to implement one or more of the example embodiments disclosed herein.

Figure 7:
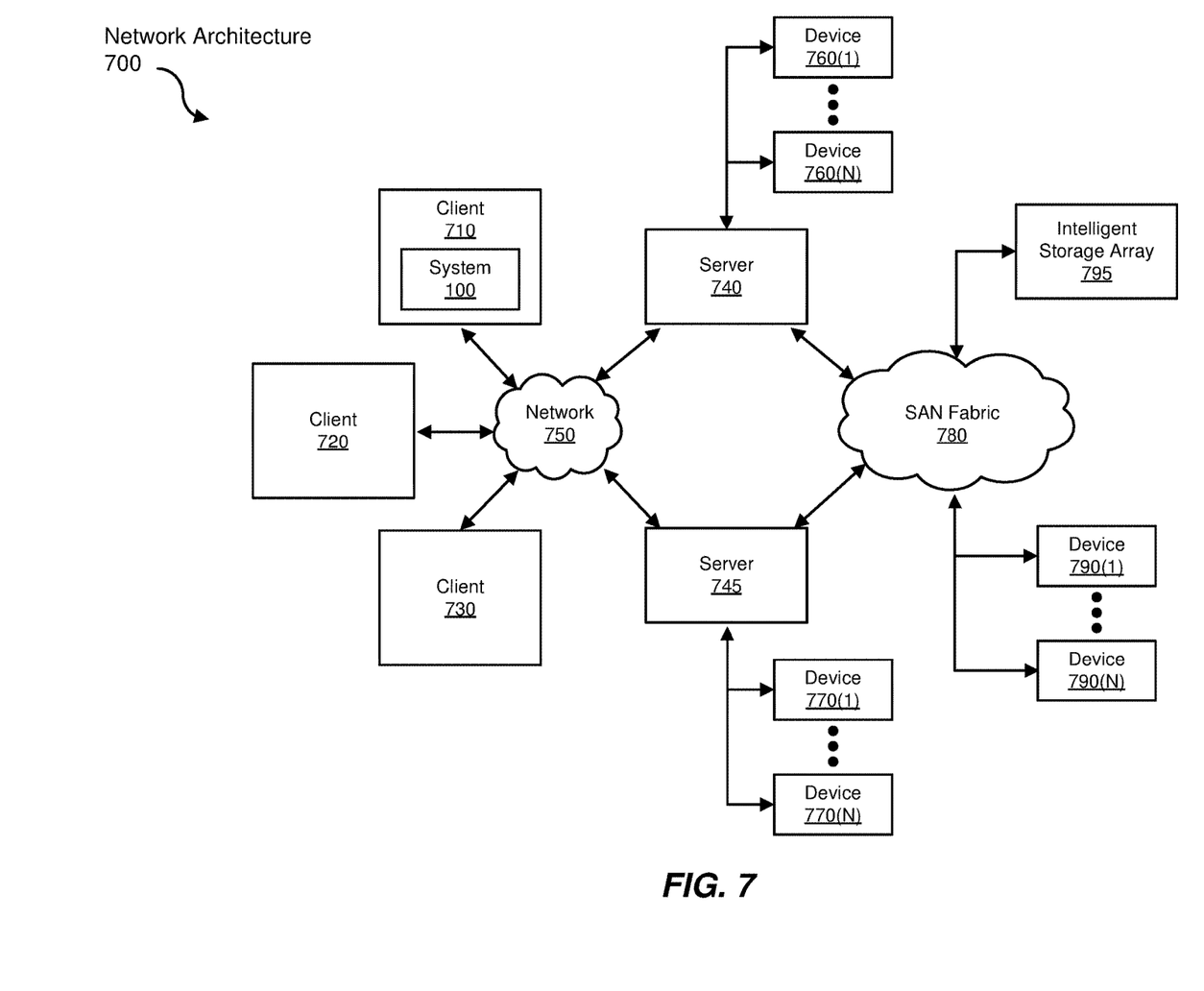
FIG. 7 is a block diagram of an example computing network capable of implementing one or more of the embodiments described and/or illustrated herein.

FIG. 7 is a block diagram of an example network architecture 700 in which client systems 710, 720, and 730 and servers 740 and 745 may be coupled to a network 750. As detailed above, all or a portion of network architecture 700 may perform and/or be a means for performing, either alone or in combination with other elements, one or more of the steps disclosed herein (such as one or more of the steps illustrated in FIG. 3). All or a portion of network architecture 700 may also be used to perform and/or be a means for performing other steps and features set forth in the present disclosure.

Client systems 710, 720, and 730 generally represent any type or form of computing device or system, such as example computing system 610 in FIG. 6. Similarly, servers 740 and 745 generally represent computing devices or systems, such as application servers or database servers, configured to provide various database services and/or run certain software applications. Network 750 generally represents any telecommunication or computer network including, for example, an intranet, a WAN, a LAN, a PAN, or the Internet. In one example, client systems 710, 720, and/or 730 and/or servers 740 and/or 745 may include all or a portion of system 100 from FIG. 1.

As illustrated in FIG. 7, one or more storage devices 760(1)-(N) may be directly attached to server 740. Similarly, one or more storage devices 770(1)-(N) may be directly attached to server 745. Storage devices 760(1)-(N) and storage devices 770(1)-(N) generally represent any type or form of storage device or medium capable of storing data and/or other computer-readable instructions. In certain embodiments, storage devices 760(1)-(N) and storage devices 770(1)-(N) may represent Network-Attached Storage (NAS) devices configured to communicate with servers 740 and 745 using various protocols, such as Network File System (NFS), Server Message Block (SMB), or Common Internet File System (CIFS).

Servers 740 and 745 may also be connected to a Storage Area Network (SAN) fabric 780. SAN fabric 780 generally represents any type or form of computer network or architecture capable of facilitating communication between a plurality of storage devices. SAN fabric 780 may facilitate communication between servers 740 and 745 and a plurality of storage devices 790(1)-(N) and/or an intelligent storage array 795. SAN fabric 780 may also facilitate, via network 750 and servers 740 and 745, communication between client systems 710, 720, and 730 and storage devices 790(1)-(N) and/or intelligent storage array 795 in such a manner that devices 790(1)-(N) and array 795 appear as locally attached devices to client systems 710, 720, and 730. As with storage devices 760(1)-(N) and storage devices 770(1)-(N), storage devices 790(1)-(N) and intelligent storage array 795 generally represent any type or form of storage device or medium capable of storing data and/or other computer-readable instructions.

In certain embodiments, and with reference to example computing system 610 of FIG. 6, a communication interface, such as communication interface 622 in FIG. 6, may be used to provide connectivity between each client system 710, 720, and 730 and network 750. Client systems 710, 720, and 730 may be able to access information on server 740 or 745 using, for example, a web browser or other client software. Such software may allow client systems 710, 720, and 730 to access data hosted by server 740, server 745, storage devices 760(1)-(N), storage devices 770(1)-(N), storage devices 790(1)-(N), or intelligent storage array 795. Although FIG. 7 depicts the use of a network (such as the Internet) for exchanging data, the embodiments described and/or illustrated herein are not limited to the Internet or any particular network-based environment.

In at least one embodiment, all or a portion of one or more of the example embodiments disclosed herein may be encoded as a computer program and loaded onto and executed by server 740, server 745, storage devices 760(1)-(N), storage devices 770(1)-(N), storage devices 790(1)-(N), intelligent storage array 795, or any combination thereof. All or a portion of one or more of the example embodiments disclosed herein may also be encoded as a computer program, stored in server 740, run by server 745, and distributed to client systems 710, 720, and 730 over network 750.

As detailed above, computing system 610 and/or one or more components of network architecture 700 may perform and/or be a means for performing, either alone or in combination with other elements, one or more steps of an example method for identifying and mitigating phishing attacks.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered example in nature since many other architectures can be implemented to achieve the same functionality.

In some examples, all or a portion of example system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In various embodiments, all or a portion of example system 100 in FIG. 1 may facilitate multi-tenancy within a cloud-based computing environment. In other words, the software modules described herein may configure a computing system (e.g., a server) to facilitate multi-tenancy for one or more of the functions described herein. For example, one or more of the software modules described herein may program a server to enable two or more clients (e.g., customers) to share an application that is running on the server. A server programmed in this manner may share an application, operating system, processing system, and/or storage system among multiple customers (i.e., tenants). One or more of the modules described herein may also partition data and/or configuration information of a multi-tenant application for each customer such that one customer cannot access data and/or configuration information of another customer.

According to various embodiments, all or a portion of example system 100 in FIG. 1 may be implemented within a virtual environment. For example, the modules and/or data described herein may reside and/or execute within a virtual machine. As used herein, the term "virtual machine" generally refers to any operating system environment that is abstracted from computing hardware by a virtual machine manager (e.g., a hypervisor). Additionally or alternatively, the modules and/or data described herein may reside and/or execute within a virtualization layer. As used herein, the term "virtualization layer" generally refers to any data layer and/or application layer that overlays and/or is abstracted from an operating system environment. A virtualization layer may be managed by a software virtualization solution (e.g., a file system filter) that presents the virtualization layer as though it were part of an underlying base operating system. For example, a software virtualization solution may redirect calls that are initially directed to locations within a base file system and/or registry to locations within a virtualization layer.

In some examples, all or a portion of example system 100 in FIG. 1 may represent portions of a mobile computing environment. Mobile computing environments may be implemented by a wide range of mobile computing devices, including mobile phones, tablet computers, e-book readers, personal digital assistants, wearable computing devices (e.g., computing devices with a head-mounted display, smartwatches, etc.), and the like. In some examples, mobile computing environments may have one or more distinct features, including, for example, reliance on battery power, presenting only one foreground application at any given time, remote management features, touchscreen features, location and movement data (e.g., provided by Global Positioning Systems, gyroscopes, accelerometers, etc.), restricted platforms that restrict modifications to system-level configurations and/or that limit the ability of third-party software to inspect the behavior of other applications, controls to restrict the installation of applications (e.g., to only originate from approved application stores), etc. Various functions described herein may be provided for a mobile computing environment and/or may interact with a mobile computing environment.

In addition, all or a portion of example system 100 in FIG. 1 may represent portions of, interact with, consume data produced by, and/or produce data consumed by one or more systems for information management. As used herein, the term "information management" may refer to the protection, organization, and/or storage of data. Examples of systems for information management may include, without limitation, storage systems, backup systems, archival systems, replication systems, high availability systems, data search systems, virtualization systems, and the like.

In some embodiments, all or a portion of example system 100 in FIG. 1 may represent portions of, produce data protected by, and/or communicate with one or more systems for information security. As used herein, the term "information security" may refer to the control of access to protected data. Examples of systems for information security may include, without limitation, systems providing managed security services, data loss prevention systems, identity authentication systems, access control systems, encryption systems, policy compliance systems, intrusion detection and prevention systems, electronic discovery systems, and the like.

According to some examples, all or a portion of example system 100 in FIG. 1 may represent portions of, communicate with, and/or receive protection from one or more systems for endpoint security. As used herein, the term "endpoint security" may refer to the protection of endpoint systems from unauthorized and/or illegitimate use, access, and/or control. Examples of systems for endpoint protection may include, without limitation, anti-malware systems, user authentication systems, encryption systems, privacy systems, spam-filtering services, and the like.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various example methods described and/or illustrated herein may also omit one or more of the steps described or illustrated herein or include additional steps in addition to those disclosed.

While various embodiments have been described and/or illustrated herein in the context of fully functional computing systems, one or more of these example embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the example embodiments disclosed herein.

In addition, one or more of the modules described herein may transform data, physical devices, and/or representations of physical devices from one form to another. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The preceding description has been provided to enable others skilled in the art to best utilize various aspects of the example embodiments disclosed herein. This example description is not intended to be exhaustive or to be limited to any precise form disclosed. Many modifications and variations are possible without departing from the spirit and scope of the present disclosure. The embodiments disclosed herein should be considered in all respects illustrative and not restrictive. Reference should be made to the appended claims and their equivalents in determining the scope of the present disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method for identifying and mitigating phishing attacks, at least a portion of the method being performed by one or more computing devices comprising at least one processor, the method comprising:
    receiving, by the one or more computing devices, a request for sensitive data utilized to access a network service;
    launching, by the one or more computing devices, an autofill provider for providing the sensitive data to the network service, wherein launching the autofill provider comprises:
        receiving a selection of the autofill provider from an autofill framework in a computing device operating system;
        presenting, to a user in a user interface, an option to launch the selected autofill provider, wherein the autofill provider comprises an application that makes a declaration as a provider to the autofill framework; and
        calling, from the autofill framework, an application programming interface to launch the autofill provider in response to receiving a user execution of the option to launch the selected autofill provider, wherein the user execution of the option to launch the selected autofill provider comprises receiving a selection of a user interface element in the user interface, wherein an identification of the selected autofill provider is displayed in the user interface as a stored credential associated with a uniform resource locator (URL);
    identifying, by the one or more computing devices and utilizing the autofill provider, a domain for the network service and a data type associated with the sensitive data utilized to access the network service;
    determining, by the one or more computing devices and utilizing the autofill provider, a reputation for the network service based on the domain and the data type; and
    performing, by the one or more computing devices, a security action that protects against a phishing attack based on the reputation determined for the network service.

2. The computer-implemented method of claim 1, wherein performing the security action comprises generating a phishing risk alert based on the reputation determined for the network service.

3. The computer-implemented method of claim 2, wherein performing the security action further comprises sending random data to the network service in response to the request for the sensitive data when the phishing risk alert is high, wherein the phishing risk alert is high when the reputation determined for the network service is associated with a known phishing website.

4. The computer-implemented method of claim 2, wherein performing the security action further comprises sending random data to the network service in response to the request for the sensitive data when the phishing risk alert is unknown.

5. The computer-implemented method of claim 1, wherein receiving the request for the sensitive data comprises receiving a request for a password to login to the network service.

6. The computer-implemented method of claim 1, wherein identifying the domain for the network service and the data type associated with the sensitive data comprises:
    identifying the uniform resource locator (URL) associated with the network service; and identifying an authentication data type describing login credentials utilized to access the network service.

7. The computer-implemented method of claim 1, wherein determining the reputation for the network service comprises:
    checking the domain and the data type against a list comprising a plurality of domains and data types having assigned reputations in one or more reputation databases; and
    determining the reputation for the network service based on the domain and the data type matching at least one of the domains and data types in the list.

8. The computer-implemented method of claim 1, wherein determining the reputation for the network service comprises:
    checking the domain and the data type against a list comprising a plurality of domains and data types having assigned reputations in one or more reputation databases; and determining the reputation for the network service based on the domain and the data type not matching any of the domains and data types in the list.

9. The computer-implemented method of claim 1, wherein the network service comprises at least one of:
   a website; or
   a mobile device web application.

10. The computer-implemented method of claim 1, wherein the autofill provider comprises a security password manager service provider that is only launched upon receiving the user execution of the option to launch the selected autofill provider.

11. A system for identifying and mitigating phishing attacks, the system comprising:
   at least one physical processor;
   physical memory comprising computer-executable instructions and one or more modules that, when executed by the physical processor, cause the physical processor to:
   receive, by a receiving module, a request for sensitive data utilized to access a network service;
   launch, by a launch module, an autofill provider for providing the sensitive data to the network service, wherein the launch module launches the autofill provider by:
      receiving a selection of the autofill provider from an autofill framework in a computing device operating system;
      presenting, to a user in a user interface, an option to launch the selected autofill provider, wherein the autofill provider comprises an application that makes a declaration as a provider to the autofill framework; and
      calling, from the autofill framework, an application programming interface to launch the autofill provider in response to receiving a user execution of the option to launch the selected autofill provider, wherein the user execution of the option to launch the selected autofill provider comprises receiving a selection of a user interface element in the user interface, wherein an identification of the selected autofill provider is displayed in the user interface as a stored credential associated with a uniform resource locator (URL);
   identify, by an identification module utilizing the autofill provider, a domain for the network service and a data type associated with the sensitive data utilized to access the network service;
   determine, by a determining module utilizing the autofill provider, a reputation for the network service based on the domain and the data type; and
   perform, by a security module, a security action that protects against a phishing attack based on the reputation determined for the network service.

12. The system of claim 11, wherein the security module performs the security action by generating a phishing risk alert based on the reputation determined for the network service.

13. The system of claim 12, wherein the security module performs the security action by sending random data to the network service in response to the request for the sensitive data when the phishing risk alert is high, wherein the phishing risk alert is high when the reputation determined for the network service is associated with a known phishing website.

14. The system of claim 12, wherein the security module performs the security action by sending random data to the network service in response to the request for the sensitive data when the phishing risk alert is unknown.

15. The system of claim 11, wherein the receiving module receives the request for the sensitive data by receiving a request for a password to login to the network service.

16. The system of claim 11, wherein the identification module identifies the domain for the network service and the data type associated with the sensitive data by:
   identifying the uniform resource locator (URL) associated with the network service; and
   identifying an authentication data type describing login credentials utilized to access the network service.

17. The system of claim 11, wherein the determining module determines the reputation for the network service by:
   checking the domain and the data type against a list comprising a plurality of domains and data types having assigned reputations in one or more reputation databases; and
   determining the reputation for the network service based on the domain and the data type matching at least one of the domains and data types in the list.

18. The system of claim 11, wherein the determining module determines the reputation for the network service by:
   checking the domain and the data type against a list comprising a plurality of domains and data types having assigned reputations in one or more reputation databases; and
   determining the reputation for the network service based on the domain and the data type not matching any of the domains and data types in the list.

19. The system of claim 11, wherein the autofill provider comprises a security password manager service provider that is only launched upon receiving the user execution of the option to launch the selected autofill provider.

20. A non-transitory computer-readable medium comprising one or more computer-executable instructions that, when executed by at least one processor of a computing device, cause the computing device to:
   receive a request for sensitive data utilized to access a network service;
   launch an autofill provider for providing the sensitive data to the network service, wherein the autofill provider is launched by:
      receiving a selection of the autofill provider from an autofill framework in a computing device operating system;
      presenting, to a user in a user interface, an option to launch the selected autofill provider, wherein the autofill provider comprises an application that makes a declaration as a provider to the autofill framework; and
      calling, from the autofill framework, an application programming interface to launch the autofill provider in response to receiving a user execution of the option to launch the selected autofill provider, wherein the user execution of the option to launch the selected autofill provider comprises receiving a selection of a user interface element in the user interface, wherein an identification of the selected autofill provider is displayed in the user interface as a stored credential associated with a uniform resource locator (URL);
   identify, utilizing the autofill provider, a domain for the network service and a data type associated with the sensitive data utilized to access the network service;

determine, utilizing the autofill provider, a reputation for the network service based on the domain and the data type; and perform a security action that protects against a phishing attack based on the reputation determined for the network service.

\* \* \* \* \*